US012762400B2

(12) United States Patent
Radhakrishnan et al.

(10) Patent No.: US 12,762,400 B2
(45) Date of Patent: Oct. 13, 2026

(54) SYSTEMS AND METHODS FOR NEURAL NETWORK BASED RECOMMENDER MODELS

(71) Applicant: Salesforce, Inc., San Francisco, CA (US)

(72) Inventors: Regunathan Radhakrishnan, San Francisco, CA (US); Zachary Alexander, Berkeley, CA (US); Sitaram Asur, Newark, CA (US); Shashank Harinath, Mountain View, CA (US); Na Cheng, Yarrow Point, WA (US); Shiva Kumar Pentyala, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 673 days.

(21) Appl. No.: 18/330,488

(22) Filed: Jun. 7, 2023

(65) Prior Publication Data

US 2024/0412059 A1 Dec. 12, 2024

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS

| | | | | |
|---|---|---|---|---|
| 2016/0174902 | A1* | 6/2016 | Georgescu | A61B 5/7267 600/408 |
| 2021/0064826 | A1* | 3/2021 | Rajagopal | G06N 3/0455 |
| 2022/0245460 | A1* | 8/2022 | Qin | G06N 3/084 |
| 2023/0025169 | A1* | 1/2023 | Hoffmann | G06N 3/045 |
| 2024/0177524 | A1* | 5/2024 | Iyengar | G06Q 10/06398 |

* cited by examiner

*Primary Examiner* — Clifford Hilaire
(74) *Attorney, Agent, or Firm* — Haynes and Boone, LLP

(57) ABSTRACT

Embodiments described herein provide A method for training a neural network based model. The methods include receiving a training dataset with a plurality of training samples, and those samples are encoded into representations in feature space. A positive sample is determined from the raining dataset based on a relationship between the given query and the positive sample in feature space. For a given query, a positive sample from the training dataset is selected based on a relationship between the given query and the positive sample in a feature space. One or more negative samples from the training dataset that are within a reconfigurable distance to the positive sample in the feature space are selected, and a loss is computed based on the positive sample and the one or more negative samples. The neural network is trained based on the loss.

20 Claims, 10 Drawing Sheets

| ORG | Data Scale | #Languages | Stats | Before | After |
|---|---|---|---|---|---|
| 00DB0000000YbFc | 600K LCTs | 3 | Total Training Time | 49.5 hr | 26 hr |
| | | | #Epochs | 11 | 4 |
| | | | Modeling Time (Per-epoch) | 3hr 36mins | 3hr 42mins |
| 00D2P0000008b9i | 800K LCTs | 8 | Total Training Time | 72hr+ *(timeout)* | 40 hr |
| | | | #Epochs | 15+ | 6 |
| | | | Modeling Time (Per-epoch) | 4hr 25mins | 4hr 22mins |

FIG. 7

SYSTEMS AND METHODS FOR NEURAL NETWORK BASED RECOMMENDER MODELS

TECHNICAL FIELD

The embodiments relate generally to machine learning systems for natural language processing (NLP), and more specifically to systems and methods for training a neural network based recommender models.

BACKGROUND

Machine learning systems have been widely used in recommendation systems, and more specifically for generating turn-wise reply recommendations for agents in customer service chat/messaging sessions. Traditional methods usually perform item recommendations using a binary classification model that is trained with labeled data indicating whether a system response of recommendation is relevant/irrelevant for a given context. However, in customer service chats, labeled training data for the negative class (e.g., a recommendation is deemed irrelevant) is often scarce.

Random sampling of negative training samples poses the risk of creeping errors into training performance if the dataset is noisy. For example, especially in multi-turn task oriented dialogue settings, the spectrum for defining negative samples can be unclear. For instance, in a conversation about order refund status, procedural style replies ("thank you for contacting us today", "let me look at your order", "could you verify your order number"), if assigned with negative labels (irrelevant), are not as strong indicators as other more substantive replies such as "To reset your password, try visiting main page and scroll down to find forgot password→verify mobile number→reset with duo→activate link". Thus, random negative sampling can introduce label errors into the training that hinders model performance.

Therefore, there is a need for systems and methods for training recommender models which are less susceptible to label errors in training data.

BRIEF DESCRIPTION OF THE DRAWINGS

FIG. 7 provides a chart illustrating exemplary performance of different embodiments described herein.

Figure 1:
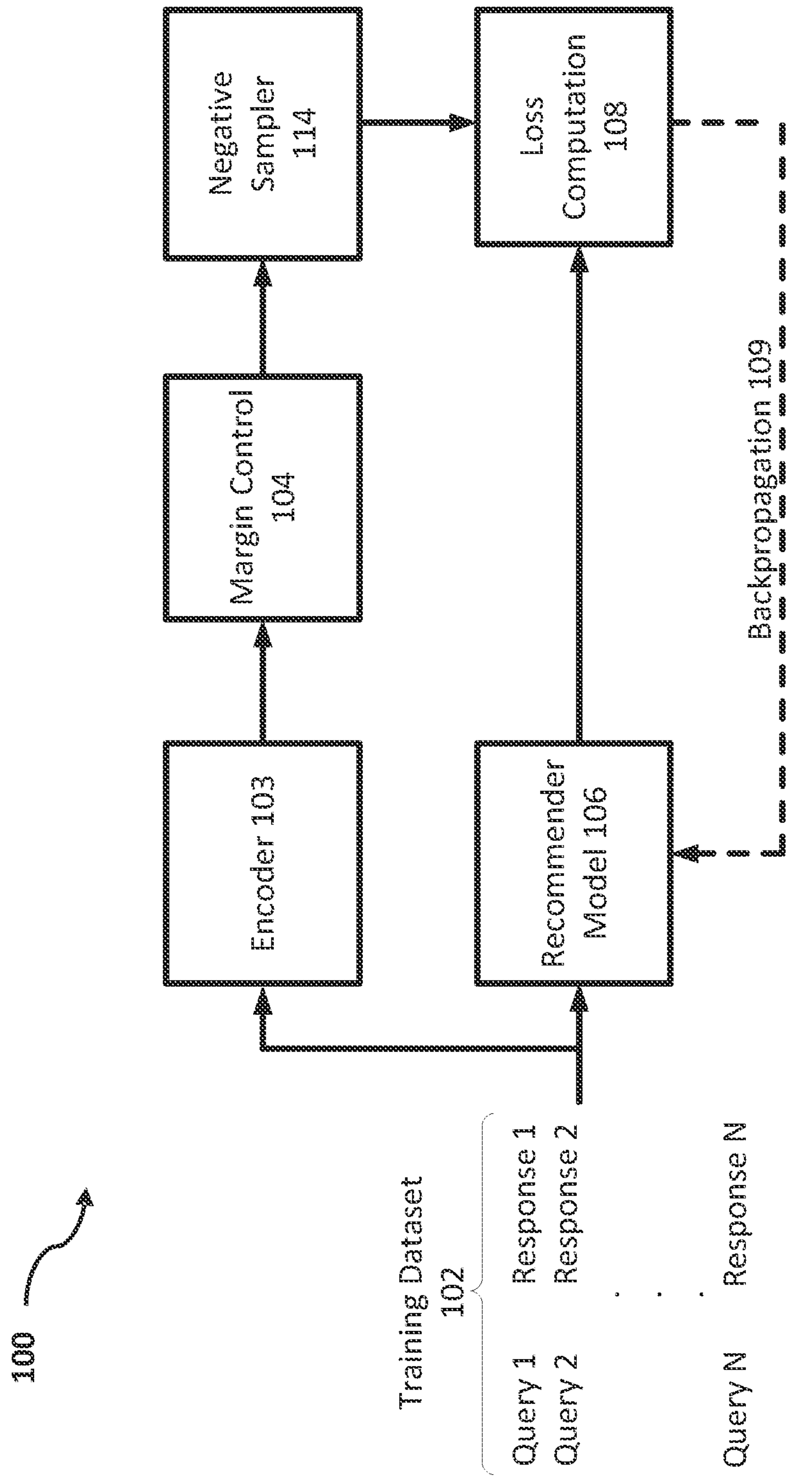
FIG. 1 is a simplified diagram illustrating a model training framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Neural network based models may be used in a variety of tasks, including item recommendation. Item recommendation may include, for example, recommending a video for someone to watch based on previous viewing behaviors, or recommending a product to buy based on past shopping behaviors. A recommender system may also be implemented to recommend text responses in the context of a chat (e.g., a customer support chat). Traditional methods of item recommendation use a binary classification model that is trained with labeled data indicating whether a system response of recommendation is relevant/irrelevant for a given context. When a training sample comprises a system response that is deemed as relevant to the chat context, the training sample is considered "positive." Otherwise, when a training sample comprises a system response that is deemed irrelevant to the chat context, the training sample is considered "negative." However, in some domains, such as customer service chats, labeled training data for the negative class (e.g., a recommendation is deemed irrelevant) is often scarce. One technique for generating a negative training sample is to perform random sampling from among all of the items in a corpus which are not the positive sample. However, random sampling of negative training samples poses the risk of creeping errors into training performance if the dataset is noisy.

For example, especially in multi-turn task oriented dialogue settings, the spectrum for samples that are considered "negative" can be unclear. For instance, in a conversation about order refund status, procedural style replies ("thank you for contacting us today", "let me look at your order", "could you verify your order number) that fail to provide a straightforwardly relevant answer to the context of order refund status, may be assigned with negative labels (irrelevant) or otherwise sampled as negative samples. But these procedural style replies are not as strong indicators of "irrelevance" as other more substantive replies such as "To reset your password, try visiting main page and scroll down to find forgot password→verify mobile number→reset with duo→activate link," which is clearly "more irrelevant" to the chat context of order refund status. This is largely due to the fact that procedural responses often do not have a well defined semantic intent, while content rich responses have a well defined intent (such as the intent of reset password).

The difficulty of categorizing procedural responses may be a source of noise in the dataset, especially when the dataset includes many more procedural responses than substantive ones. Such "noise" in the training dataset may cause the training of the model to take longer to converge, and may result in a less accurate model.

One way to mitigate a noisy dataset is to control what data is used for training. In addition to label a sample as "negative," the level of irrelevance of a negative sample for a given query, e.g., "easy" or "hard" negative samples, is also considered. For instance, a response which the model predicts to be far away (in a representation space) from the positive sample may be considered an "easy" negative sample, as a model may easily recognize that such a response is not appropriately recommended. On the other hand, responses which are more closely related to a "correct" (positive) response may be considered "hard" negatives, as they are conceptually closer and therefore more difficult for a model to distinguish. Such "easy" or "hard" negative samples may be defined based on whether they are located within a radius from the positive sample in the feature space.

Such "hard" negative samples tend to be more informative in training a model. Training on more informative negative samples may allow a model to converge more quickly to an accurate model. However, if the dataset is noisy (e.g., there are many more "procedural" responses than substantive responses), focusing too much on hard negative samples may cause problems with model convergence and accuracy. Conceptually, it may be beneficial to first train a model on mostly easy negative samples, and then progressively train on harder negative samples as the model begins to converge. Further, in order to avoid local minima in the search space of the model, it may be beneficial to repeatedly introduce negative samples of varying difficulty, as is described in more detail herein.

In the context of a multi-turn task oriented dialogue training dataset, if there are many more procedural responses than substantive content rich responses, there is a higher scope for negative sampling to introduce higher noise. In that case, it may be desirable to rely more on easy or semi-hard or less-hard examples. On the other hand, when the training dataset contains many more content rich (substantive) responses than procedural responses, it may be desirable to introduce hard samples early in the learning process since content-rich templates would have more diverse sentence embeddings thus resulting in a clear cluster groups.

In view of the need for systems and methods for training recommender models which are less susceptible to label errors in training data, embodiments described herein provide a training framework for a neural network based model using both positive and negative training samples according to its respective level of irrelevance, e.g., a level of deviation or distance from respective positive samples in the feature space. Negative training samples may be fed to the model periodically according to the respective level of deviation over the course of training. For example, training samples may be encoded by the neural network based model into a features space, at which negative samples are selected such that their corresponding representations in the feature space are within a defined marginal "distance" to the representation of a given sample. Specifically, a level of deviation or irrelevance (easy vs. hard) of negative samples is defined based on the cosine similarity with respect to the representation of a positive sample (e.g., negative samples closer in representation space to the positive sample are considered "harder").

In some embodiments, negative samples having different levels of irrelevance or deviation from the positive sample are chosen for training together with corresponding positive samples. A margin based loss may be computed based on at least in part on the marginal distance in the feature space between a negative sample and a positive sample that correspond to the same query. The value of the "margin" refers to a threshold distance in the feature space over which negative samples are used for computing the loss. By controlling the margin to filter negative samples for training, negative sampling bias may be reduced, leading to improved performance of the trained neural network based model. By varying the margin over the training sequence compared to a fixed margin, the model is less likely to over or under fit the training data. Neural network technology is thus improved.

In some embodiments, negative sampling is varied over the training sequence by varying the margin of a margin-based loss according to a pre-defined curriculum that specifies how the margin is to be varied. For example, the curriculum may vary the margin in a triangular fashion as discussed illustrated in FIG. 3. Varying the margin results in training that is stabilized with improved model convergence rate, accuracy metrics, and generalization abilities. Thus this solution can effectively handle negative sampling bias, and make the learning much smoother, and quicker.

Embodiments described herein provide a number of benefits. For example, convergence rate is significantly improved, meaning that less computational resources are required for the same or better performance. Accuracy metrics are also improved, such that the model at inference more accurately predicts a relevant response to a conversation. Therefore, with improved performance on conducting an intelligent agent conversation with users, neural network technology in automatic intelligent agents (e.g., in customer service, etc.) is improved.

FIG. 1 is a simplified diagram illustrating a model training framework 100 according to some embodiments. The model training framework 100 comprises a training dataset 102, which is used to train a recommender model 106. Training dataset 102 may include a number of queries such as query 1, query 2, . . . , to query N. In some embodiments, the query is a conversation context, which is at least a portion of a text conversation. The responses such as response 1, response 2, . . . , to response N are the corresponding next responses in the conversations in the dataset 102. As such, each response associated with each query would generally be the "positive" sample, and responses to other queries may be the "negative" samples. Given queries from the training dataset 102 as inputs, recommender model 106 provides an output recommended response. Encoder 103 encodes the query (e.g., conversation context) and responses into vector representations in a feature space. Encoder 103 may be an encoder portion of the recommender model 106 itself, or may be a separate embedding model. Such a separate embedding model may be trained on unsupervised data which is similar to the training dataset 102. During training of recommender model 106, encoder 103 (whether included in recommender model 106 or not) may have its parameters frozen (i.e., not updated during training), or may be trained jointly with recommender model 106. The training of recommender model 106 is controlled, at least in part, by margin control 104, which controls (e.g., but varying the margin) which negative samples are used (or how they are weighted) for loss computation 108, based on their relative position with respect to the current positive sample in feature space as encoded by encoder 103. Negative sampler 114 samples negative responses based on the margin value provided by margin control 104. Loss computation 108 computes a loss based on the output of recommender model 106, with negative samples contributing to the loss computation according to negative sampler 114. The computed loss from loss computation 108 is used to update parameters of recommender model 106 using gradient descent on the loss via backpropagation 109. The model training framework 100 may be used, for example, in training a recommender model 106 which recommends a text response in a conversation (e.g., multi-turn task oriented dialogue) based on the prior utterances (i.e., context) of the conversation. Training dataset 102 may include a number of text-based multi-turn conversations. The conversations may include many types of responses, including both substantive (content rich) and procedural responses.

As discussed above, recommender model 106 may converge more quickly and produce more accurate predictions by varying the types of negative samples used during training. Margin control 104 may, for example, adjust a margin over the course of a training procedure, such that hard and easy negative samples are introduced to varying degrees as discussed with respect to FIGS. 2-3.

Figure 2:
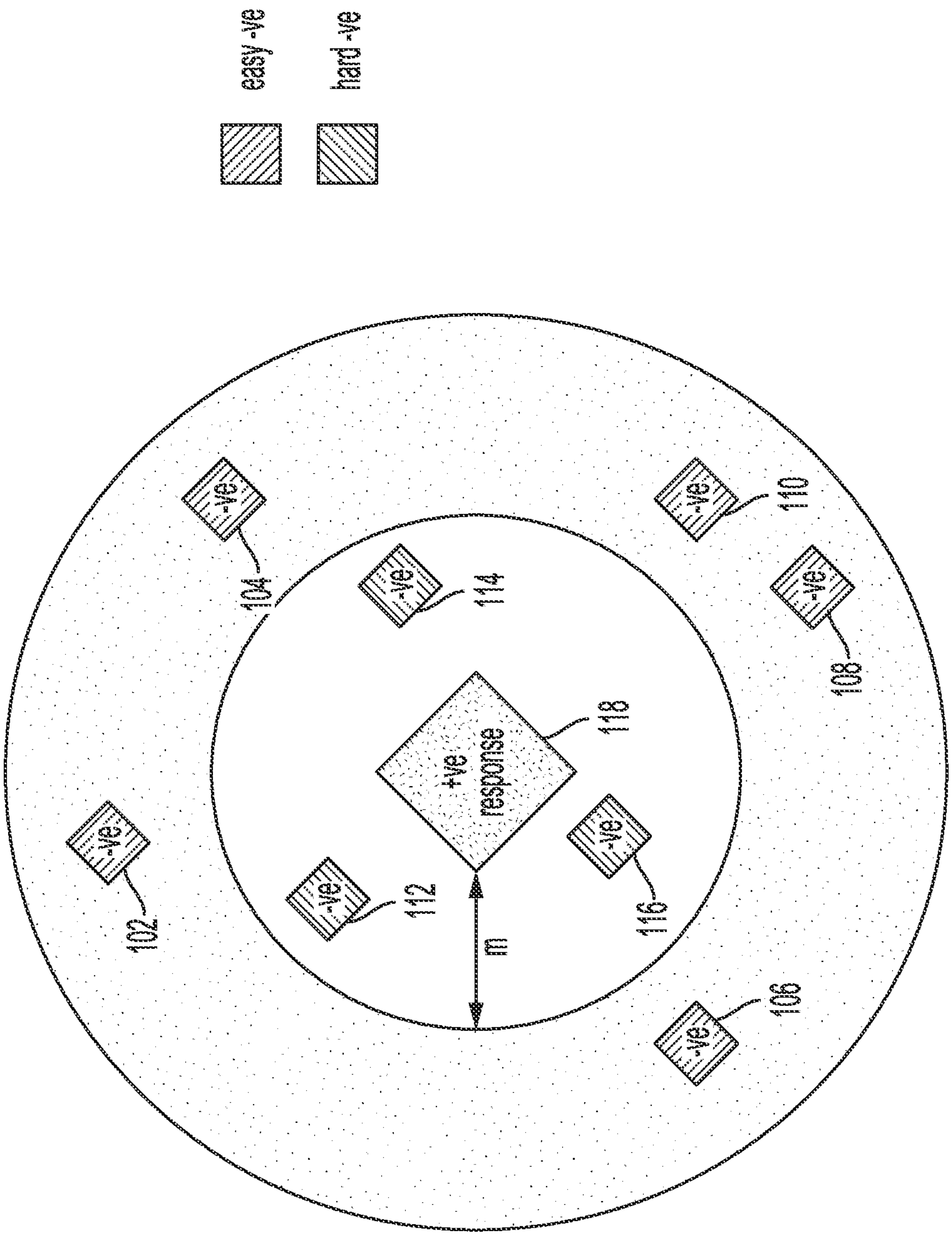
FIG. 2 is a simplified diagram illustrating a margin loss formulation according to some embodiments.

FIG. 2 is a simplified diagram illustrating a margin loss formulation computed by the loss computation module 108 in FIG. 1 in the feature space, according to some embodiments. What is shown is a simplified representation of a feature (representation) space. Each diamond in FIG. 2 represents an encoded (vectorized) representation of a text response from the training data. In some embodiments, an encoder portion of the recommender model 106 is used to generate the embedded representations of the responses. The encoder of recommender model 106 may be updated during training, or may be frozen, allowing other portions of recommender model to be updated, such as adapter layers. In other embodiments, a separate static embedding model may be used to produce the vector representations of the responses. Such a static embedding model may be trained on unsupervised data which is similar to the training dataset 102.

The center of the diagram represents a "positive" response 118, meaning the actual response in the training data for a given conversation context. All the other diamonds (102-116) represent negative sample responses, theoretically including all catalogued responses in the training data, or only those within a certain conversation or batch of conversations. Negative samples which are closer (e.g., in Euclidean distance) to the positive sample 118 are considered "harder" (e.g., 112-114), as the closer representations are in this space the more difficult it is for a model to distinguish them. On the other hand, the further away a negative sample (e.g., 102-110) is from the positive sample 118, the "easier" that sample is to distinguish from the positive sample 118.

A margin based loss function may be used to divide negative samples into two categories: negative samples within a margin distance m from the positive sample in representation space, and those further than margin distance m from the positive sample. Margin distance m is illustrated in FIG. 2, with those negative samples outside the circle defined by m being "easy" samples. For a static margin m, the framework would look like splitting negative samples into 2 buckets, and applying margin loss to relax learning on easy negatives and focus on hard negatives. To implement this behavior, a metric learning formulation may be leveraged to learn to predict the relative distances between inputs. The loss function operates on pairs of samples, and it learns a feature space such that positive and negative samples are separated by a margin "m". Margin loss formulation makes the model learn a response embedding space where true (positive) responses are separated from negative responses by at least margin m distance m. This kind of learning may reduce the negative impact of noisy labels.

Loss computation 108 in FIG. 1 may be a margin loss, using a margin representation as illustrated in FIG. 2. Margin loss may be represented as:

$$L(c_i, r_i^+, r_{i,1}^-, \ldots, r_{i,B-1}^-) = \sum_{j=1}^{B-1} \max(0, m - sim(c_i, r_i^+) + sim(c_i, r_i^-)) \quad (1)$$

Where $c_i$ is the ith context vector in a batch, L is the loss for this one context, $r_i^+$ is the true (positive) response vector corresponding to the context $c_i$, j is the jth response in the batch that is not the true response to $c_i$, sim(c,r) is the dot-product of a context vector c and a response vector r, and m is the margin. Margin m may be modified according to a training curriculum throughout the training process, for example as discussed in FIG. 3. As shown in equation (1), by adjusting the margin m, hard samples are still included in the training, but discounted in the loss based on margin value. Note that margin definition in the loss is on the similarity space, so say we have hard negative, for example-→sim(c, r−) be 0.8 and sim(c, r+) be 0.9. Then loss=max(0, m−0.1) higher margin here means higher penalty and similarly lower margin would discount loss for easy hard negatives.

As an alternative, margin loss can also be implemented as a pairwise ranking loss/contrastive loss formulation based on whether the system is configured to operate on Euclidean or dot product. The loss function in this case may be represented as:

$$L(d, Y) = \frac{1}{2} * Y * d^2 + (1 - Y) * \frac{1}{2} * \max(0, m - d)^2 \quad (2)$$

Where d is the distance between the positive and negative samples in representation space, Y is the label of the model inputs (1 if similar, 0 if dissimilar), and m is the margin. By labeling with Y, the loss causes the model to maximize the distance between dissimilar items, and minimize distance between dissimilar items (e.g., responses). In some embodiments, the Y label is 1 (similar) for the positive sample of a given context, and 0 (dissimilar) for the negative samples.

Figure 3:
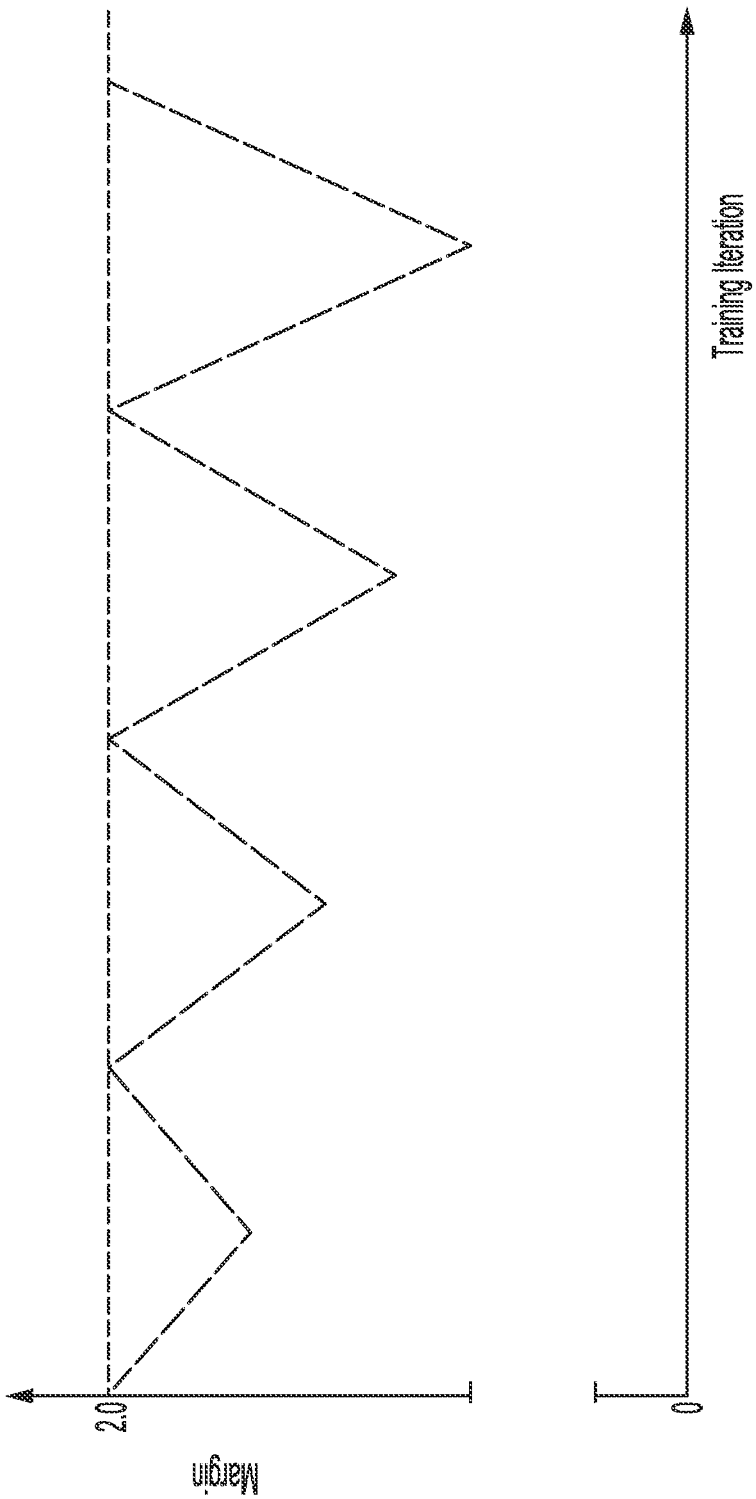
FIG. 3 is a simplified diagram illustrating an aspect of controlling a margin throughout the course of training by the margin controller described in FIG. 1, according to some embodiments.

FIG. 3 is a simplified diagram illustrating a training curriculum according to some embodiments. The X-axis represents training iterations of the recommender mode (e.g., recommender model 106 in FIG. 1), and the Y-axis represents margin (m in equation 1). As illustrated, the margin using in the margin loss function may be adjusted throughout a training process. In the illustrated example, m starts at a value of 2, decreases linearly, then increases linearly. The triangular adjustment of m may be repeated multiple times (e.g., 4 times as illustrated). Each repetition of the triangular modification of m may reach a different value before beginning to increase m again. In this way, training may focus iteratively on hard and easy samples over time. This balances the different concerns of convergence rate, stability, and accuracy. Other shapes besides triangular may be used for modifying m. For example, an exponential decay, sinusoids, step-wise functions, etc. may be utilized.

The decay rate (the rate of change of m per training batch) may be set based on some factor. In one embodiment, the decay rate is proportional to the ratio of content rich responses to procedural responses. The more procedural responses there are in the training data than substantive content rich responses, the higher the estimated noise is in the dataset. In the case of high estimated noise, it may be beneficial to more slowly introduce hard samples, allowing the model to spend more time learning on "easy" samples. On the other hand, when the training dataset contains many more content rich (substantive) responses than procedural responses, the dataset may not have much noise, and therefore it may be desirable to introduce hard samples early in the learning process, which is achieved by a faster decay rate of m. The number of procedural and content rich responses may be determined or estimated by human-annotated labels, or by automatically generated labels. One method of labeling responses is a heuristic based on utterance length percentile, punctuation marks, dependency parsing, etc.

Computer and Network Environment

Figure 4A:
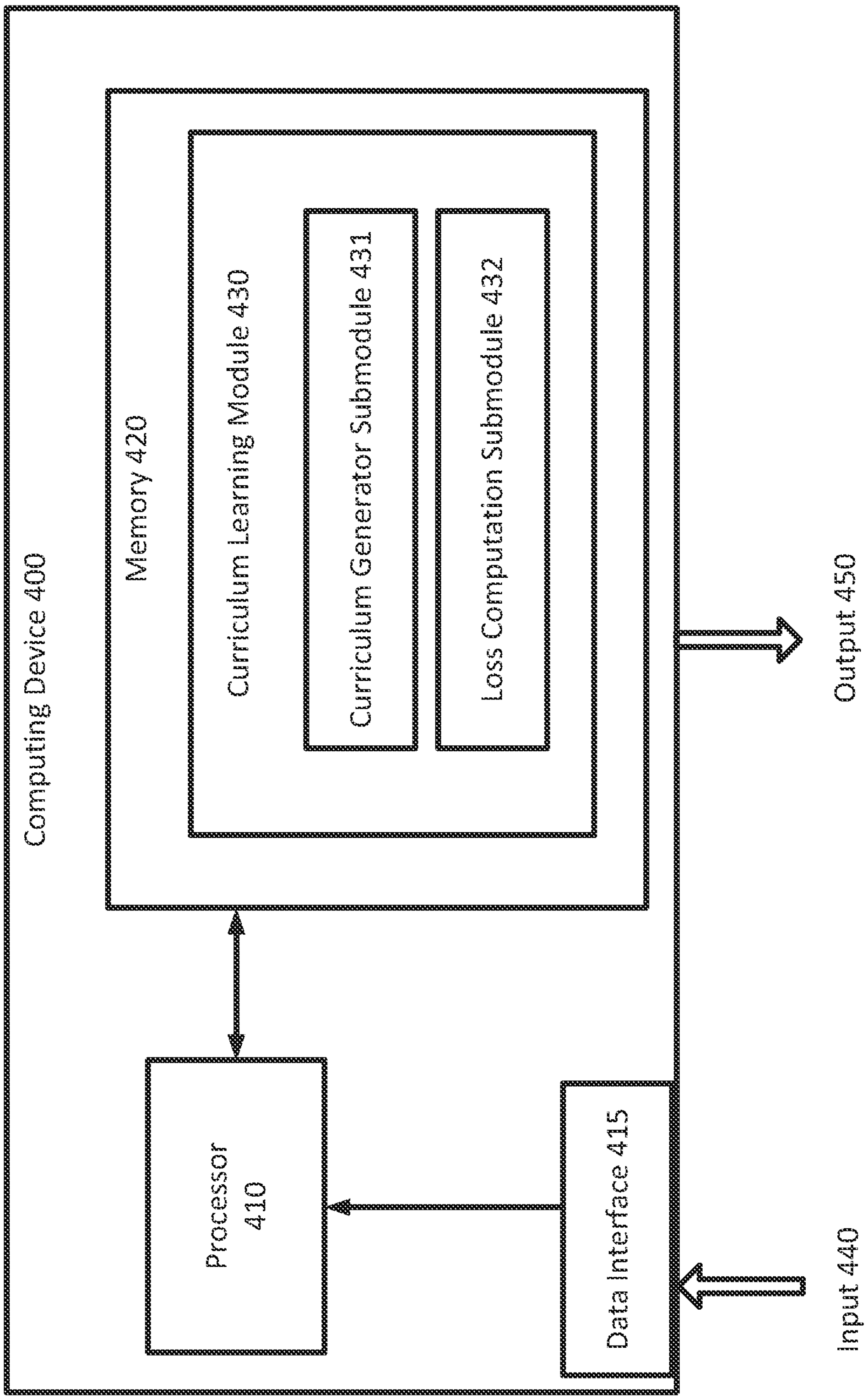
FIG. 4A is a simplified diagram illustrating a computing device implementing the model training framework described in FIGS. 1-3, according to some embodiments.

FIG. 4A is a simplified diagram illustrating a computing device implementing the model training framework described in FIGS. 1-3, according to some embodiments. As shown in FIG. 4A, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for curriculum learning module 430 that may be used to implement and/or emulate the systems and models, and/or to implement any of the methods described further herein. curriculum learning module 430 may receive input 440 such as an input training data (e.g., multi-turn conversations) via the data interface 415 and generate an output 450 which may be a recommended response given a conversation context.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as conversation text, from a user via the user interface.

In some embodiments, the curriculum learning module 430 is configured to train a recommender model using varying negative sampling difficulty over the training process. The curriculum learning module 430 may further include curriculum generator submodule 431 (e.g., similar to margin control 104 in FIG. 1). Curriculum generator submodule 431 may provide a varying margin value, for example, which may be used in training the recommender model. The specific values and/or rate of change of the margin produced by curriculum generator submodule 431 may be based on an amount of noise estimated to be in the training data. The curriculum learning module 430 may further include loss computation submodule 432 (e.g., similar to loss computation 108 in FIG. 1). Loss computation submodule 432 may compute a loss using the positive and negative samples for a given conversation context. The loss computed may be, for example, a margin-based loss, or a categorical cross entropy loss. Samples may be selected (and/or weighted) for the loss computation based on the output of the curriculum generator submodule 431.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4B:
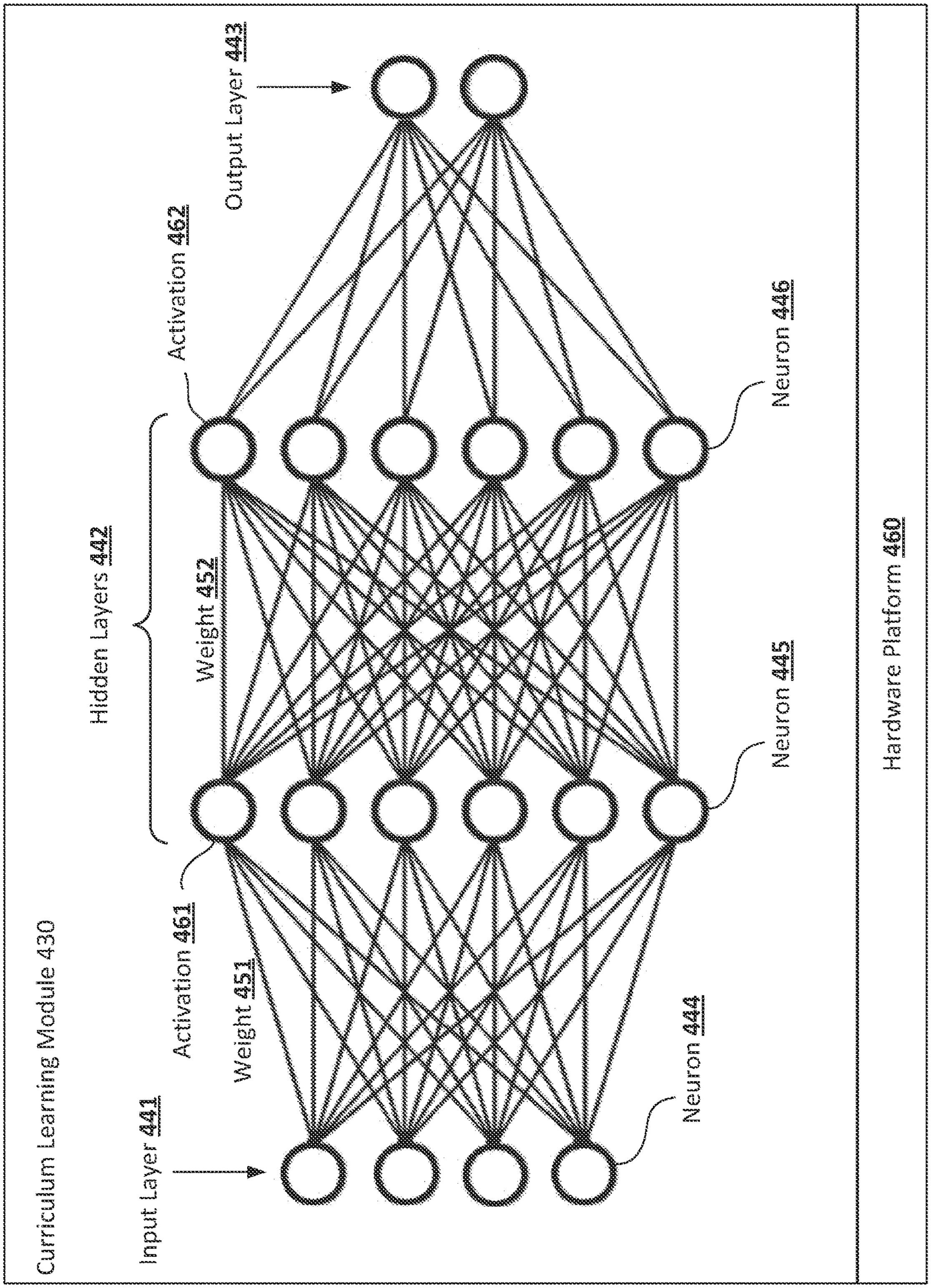
FIG. 4B is a simplified diagram illustrating a neural network structure, according to some embodiments.

FIG. 4B is a simplified diagram illustrating the neural network structure implementing the curriculum learning module 430 described in FIG. 4A, according to some embodiments. In some embodiments, the curriculum learning module 430 and/or one or more of its submodules 431-432 may be implemented at least partially via an artificial neural network structure shown in FIG. 4B. The neural network comprises a computing system that is built on a collection of connected units or nodes, referred to as neurons (e.g., 444, 445, 446). Neurons are often connected by edges, and an adjustable weight (e.g., 451, 452) is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 440 in FIG. 4A), such as a conversation context which may include multiple utterances. The number of nodes (neurons) in the input layer 441 may be determined by the dimensionality of the input data (e.g., the length of a vector of representing a conversation context). Each node in the input layer represents a feature or attribute of the input.

The hidden layers 442 are intermediate layers between the input and output layers of a neural network. It is noted that two hidden layers 442 are shown in FIG. 4B for illustrative purpose only, and any number of hidden layers may be utilized in a neural network structure. Hidden layers 442 may extract and transform the input data through a series of weighted computations and activation functions.

For example, as discussed in FIG. 4A, the curriculum learning module 430 receives an input 240 of a conversation context and transforms the input into an output 450 of a recommended response. To perform the transformation, each neuron receives input signals, performs a weighted sum of the inputs according to weights assigned to each connection (e.g., 451, 452), and then applies an activation function (e.g., 461, 462, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the curriculum learning module 430 and/or one or more of its submodules 431-432 may comprise the transformative neural network structure of layers of neurons, and weights and activation functions describing the non-linear transformation at each neuron. Such a neural network structure is often implemented on one or more hardware processors 410, such as a graphics processing unit (GPU). An example neural network may be a recommender model, and/or the like.

In one embodiment, the curriculum learning module 430 and its submodules 431-432 may be implemented by hardware, software and/or a combination thereof. For example, the curriculum learning module 430 and its submodules 431-432 may comprise a specific neural network structure implemented and run on various hardware platforms 460, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 460 used to implement the neural network structure is specifically configured based on factors such as the complexity of the neural network, the scale of the tasks (e.g., training time, input data scale, size of training dataset, etc.), and the desired performance.

In one embodiment, the neural network based curriculum learning module 430 and one or more of its submodules 431-432 may be trained by iteratively updating the underlying parameters (e.g., weights 451, 452, etc., bias parameters and/or coefficients in the activation functions 461, 462 associated with neurons) of the neural network based on the loss described in equation (1). For example, during forward propagation, the training data such as conversation text are fed into the neural network. The data flows through the network's layers 441, 442, with each layer performing computations based on its weights, biases, and activation functions until the output layer 443 produces the network's output 450. In some embodiments, output layer 443 produces an intermediate output on which the network's output 450 is based.

The output generated by the output layer 443 is compared to the expected output (e.g., a "ground-truth" such as the corresponding actual response in a given conversation) from the training data, to compute a loss function that measures the discrepancy between the predicted output and the expected output. For example, the loss function may be a margin loss, a categorical cross entropy loss, other forms of contrastive loss, etc. Given the loss, the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

Parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as new chats between a customer service representative and a client.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in recommender systems, especially recommender systems for multi-turn task oriented dialogue.

Figure 5:
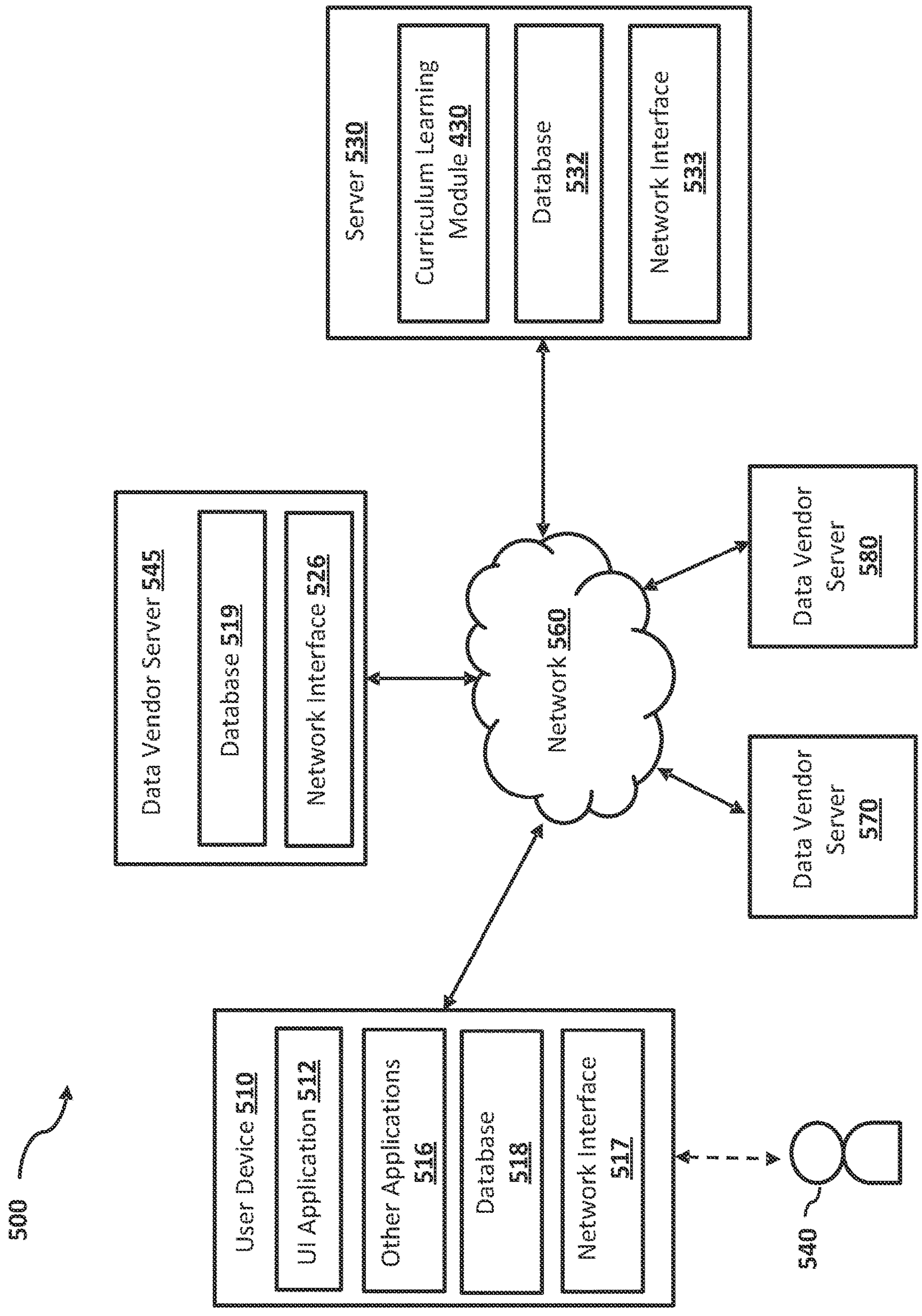
FIG. 5 is a simplified block diagram of a networked system suitable for implementing the model training framework described in FIGS. 1-4 and other embodiments described herein.

FIG. 5 is a simplified block diagram of a networked system 500 suitable for implementing the model training framework described in FIGS. 1-4 and other embodiments described herein. In one embodiment, system 500 includes the user device 510 which may be operated by user 540, data vendor servers 545, 570 and 580, server 530, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4A, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating a recommended response from the server 530 and display the message via the UI application 512. In other embodiments, user device 510 may include additional or different modules having specialized hardware and/or software as required.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view a chat window with responses recommended by the model (e.g., model 106 in FIG. 1).

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 517 adapted to communicate with data vendor server 545 and/or the server 530. In various embodiments, network interface component 517 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts database 519 to provide training datasets including chat transcripts to the server 530. The database 519 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 519, via the network interface 526, to the server 530.

The server 530 may be housed with the curriculum learning module 430 and its submodules described in FIG. 4A. In some implementations, curriculum learning module 430 may receive data from database 519 at the data vendor server 545 via the network 560 to train the recommender model. Recommended responses may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the curriculum learning module 430. In one implementation, the database 532 may store previously generated responses, and the corresponding input feature vectors.

In some embodiments, database 532 may be local to the server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545, 570 or 580 over network 560. In various embodiments, network interface component 533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Example Work Flows

Figure 6:
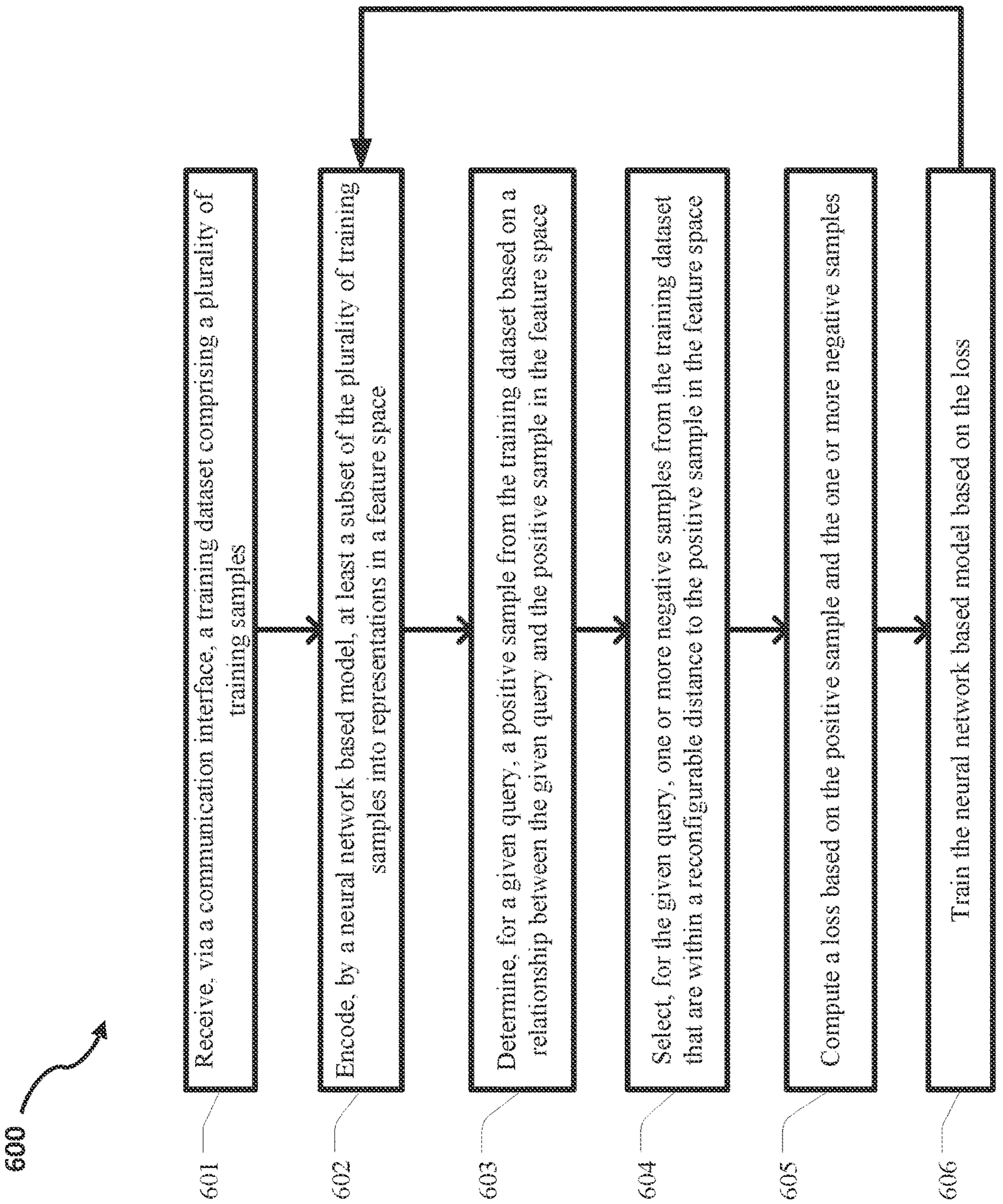
FIG. 6 is an example logic flow diagram illustrating a method of neural network based model training based on the framework shown in FIGS. 1-5, according to some embodiments.

FIG. 6 is an example logic flow diagram illustrating a method of neural network based model training based on the framework shown in FIGS. 1-5, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the curriculum learning module 430 (e.g., FIGS. 4A and 5) that performs the curriculum based model training.

As illustrated, the method 600 includes a number of enumerated steps, but aspects of the method 600 may include additional steps before, after, and in between the enumerated steps. In some aspects, one or more of the enumerated steps may be omitted or performed in a different order.

At step 601, a system (e.g., computing device 400 in FIG. 4A) receives, via a communication interface (e.g., data interface 415 in FIG. 4A), a training dataset (e.g., training dataset 102 in FIG. 1) comprising a plurality of training samples. The training samples may be, for example, multi-turn text based conversations.

At step 602, the system encodes, by a neural network based model (e.g., recommender model 106 in FIG. 1), at least a subset of the plurality of training samples into representations in a feature space.

At step 603, the system determines, for a given query, a positive sample from the training dataset based on a relationship between the given query and the positive sample in the feature space (e.g., as represented in FIG. 2). For example, the query may be a conversation context which includes one or more utterances in a conversation up to the point at which a recommended response is desired. The conversation context may be encoded into the same feature space, and the positive sample may be that which is closest to the encoded context in the feature space.

At step 604, the system selects, for the given query, one or more negative samples from the training dataset that are within a reconfigurable distance to the positive sample in the feature space. For example, the reconfigurable distance may be a margin distance described in FIGS. 2-3.

At step 605, the system computes a loss based on the positive sample and the one or more negative samples (e.g., as in loss computation 108 in FIG. 1). As discussed with respect to FIG. 2, samples further than the margin distance from the positive sample may not contribute to the computed loss. In this way, the margin (reconfigurable distance) may control the relative amount of easy samples compared to hard samples are used in the loss computation. The "selecting" of samples may be implemented by only including the selected samples in the loss computation, or may be implemented by only giving selected samples weight (or only giving them substantial weight) in the loss computation.

At step 606, the system trains the neural network based model based on the loss. The training may include computing a gradient of the loss function, and updating parameters of the neural network based model in the direction of the gradient such that it reduces the loss.

Steps 602-606 may be iteratively performed across a plurality of iterations. In this way gradient descent may be performed step-by-step, and at each iteration, a different query (e.g., conversation context), with corresponding positive and negative samples may be used. The samples may or may not be re-encoded in each iteration, meaning that step 602 is not necessarily performed in every iteration. In some embodiments, the loss is computed and the model is updated based on a batch of queries. The reconfigurable distance (e.g., margin) may be reconfigured across different iterations. For example, the system may decrease the margin distance across a first portion of the plurality of iterations, and increase the margin distance across a second portion of the plurality of iterations (e.g., as illustrated in FIG. 3). This decreasing and increasing may be repeated a predetermined number of times.

The rate of the increase and/or decrease (i.e., the "decay rate") may be computed by the system based on an estimate of an amount of noise in the training dataset. The noise may be estimated, for example, based on dividing the training data into two categories (e.g., procedural and content rich responses), and determining the ratio of those two categories in the dataset. If one of the categories is more associated with noisy data, then the ratio may be used as an indicator of the relative amount of noise in the data. In this way, the decay rate can be computed in proportion to the estimated noise.

Example Results

FIG. 7 provides a chart illustrating exemplary performance of different embodiments described herein. The first illustrated results shows the training time to converge with an without an embodiment of the methods described herein. The first example being trained for 3 languages. As illustrated, the methods of varying the hard and easy negative samples resulted in approximately 3× faster convergence. A similar result is illustrated for a model with 8 languages.

Figure 8A:
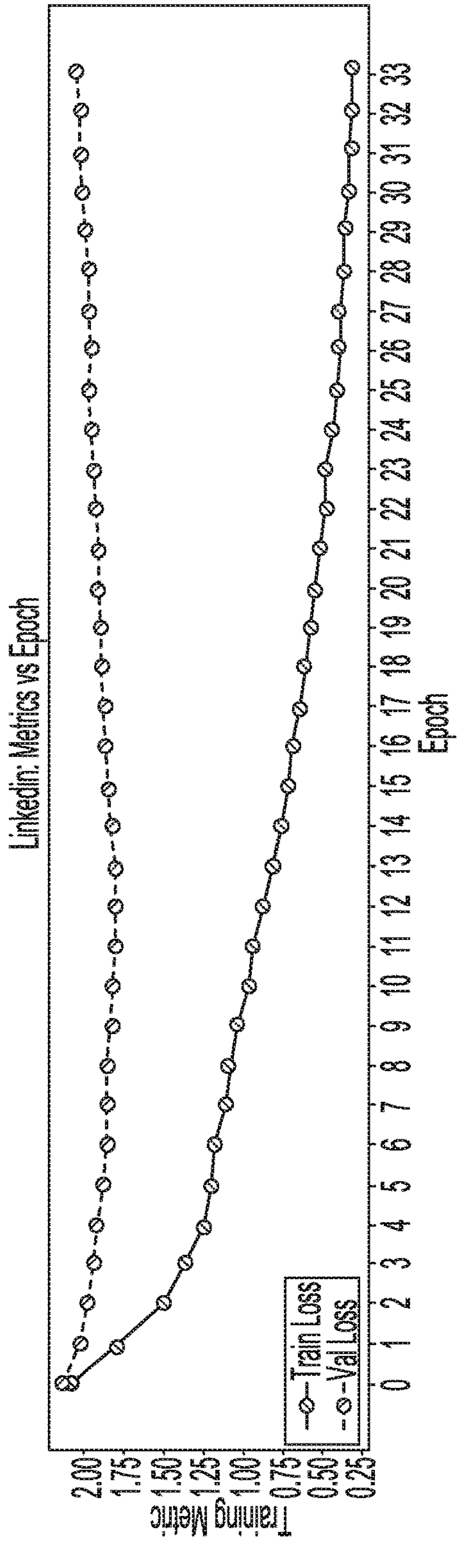
FIG. 8A provides a chart illustrating exemplary performance of different embodiments described herein.
Figure 8B:
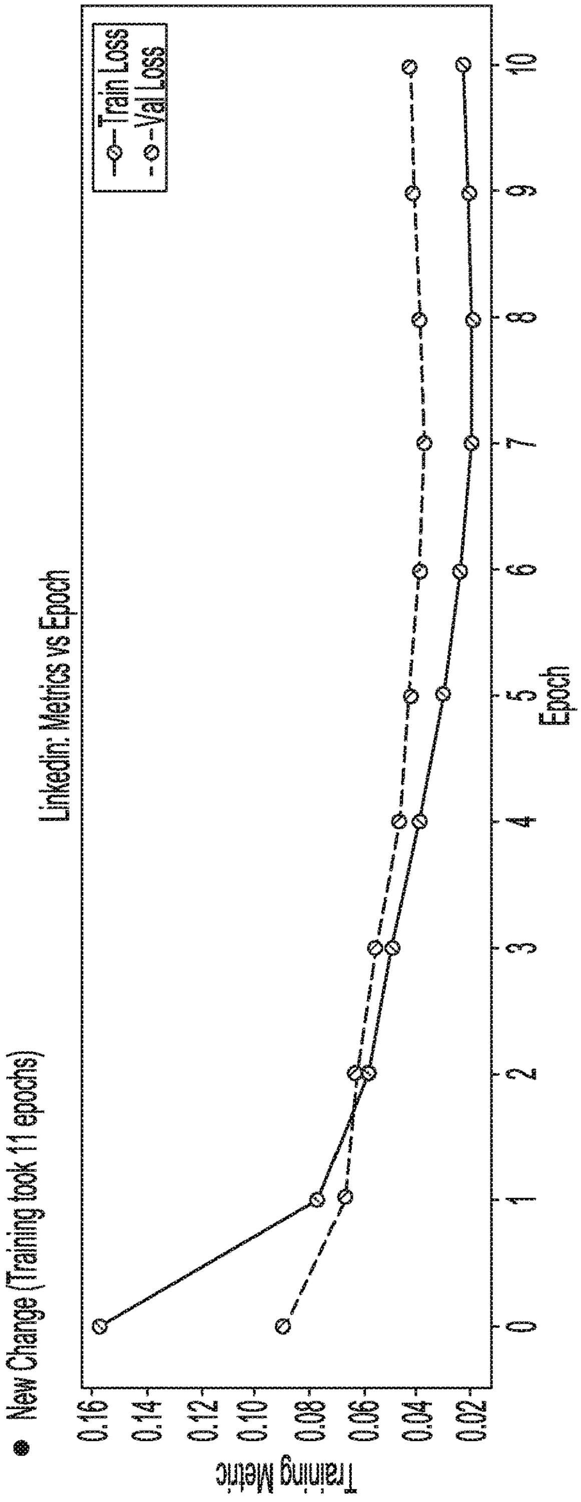
FIG. 8B provides a chart illustrating exemplary performance of different embodiments described herein.

FIGS. 8A and 8B provide charts illustrating exemplary performance of different embodiments described herein. Results illustrated show loss on training data and validation data respectively, with FIG. 8B showing performance under a legacy training method, and FIG. 8B illustrating performance using an embodiment of the methods described herein. As illustrated, the model converges much faster using the described methods. Further, as evidenced by the converging loss on the validation set, the increased convergence rate does not result in overfitting to the training data, but rather improves performance on a validation data set.

Figure 9:
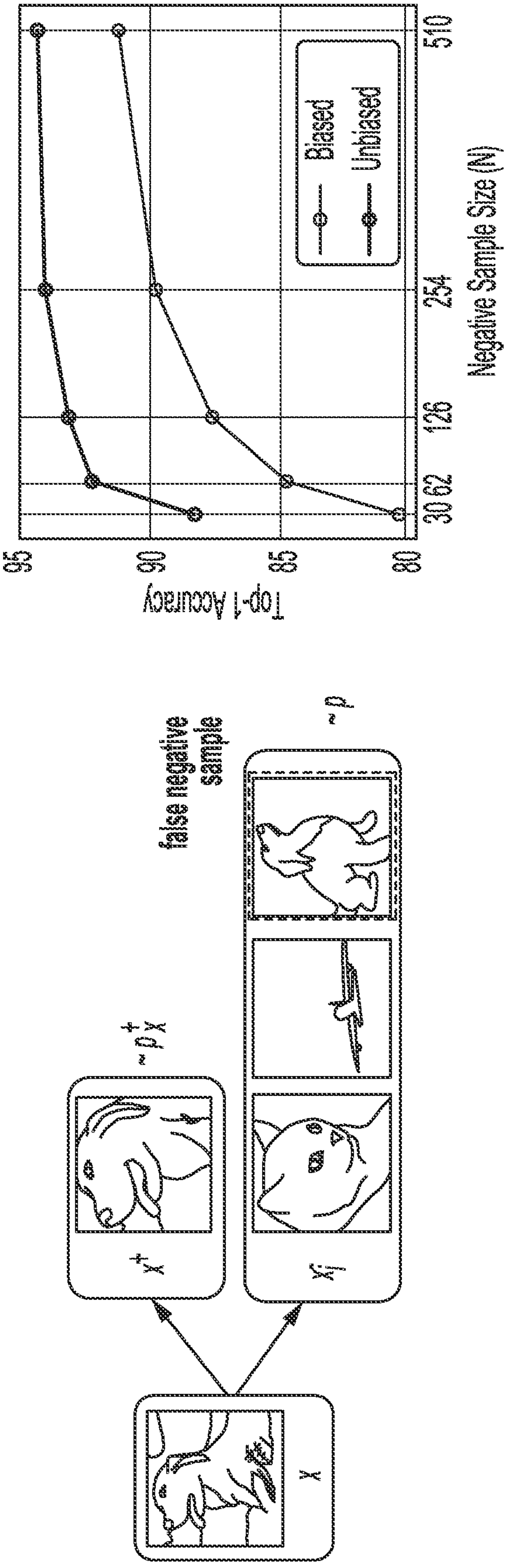
FIG. 9 provides an illustration of noisy negative sampling.

FIG. 9 provides an illustration of noisy negative sampling. This figure illustrates that embodiments described herein may be applied in other domains besides recommending conversation responses. In the illustrated example of a computer vision task, an anchor image is represented by a picture of a dog, a positive sample is represented by a slightly modified picture of the same dog, and negative samples include a cat, an airplane, and the same dog in a different pose. Given a task of identifying a dog, the negative sample of a dog in a different pose is an example of a false negative sample.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for training a neural network based model, comprising:

receiving, via a communication interface, a training dataset comprising a plurality of training samples;

encoding, by the neural network based model, at least a subset of the plurality of training samples into representations in a feature space;

determining, for a given query, a positive sample from the training dataset based on a relationship in the feature space between the given query and the positive sample;

selecting, for the given query, one or more negative samples from the training dataset that are within a reconfigurable distance in the feature space to the positive sample;

computing a loss based on the positive sample and the one or more negative samples;

training the neural network based model based on the loss; and iteratively performing the determining, selecting, computing, and training across a plurality of iterations by:

decreasing the reconfigurable distance across a first portion of the plurality of iterations, wherein a rate of the decreasing is computed based on an estimate of an amount of noise in the training dataset, and increasing the reconfigurable distance across a second portion of the plurality of iterations.

2. The method of claim 1, further comprising:

determining a first subset of samples of the training dataset are of a first category; and determining a second subset of samples of the training dataset are of a second category, wherein the estimate of the amount of noise in the training dataset is proportional to a ratio of a number of samples in the first category to a number of samples in the second category.

3. The method of claim 1, wherein the first portion of the plurality of iterations is before the second portion of the plurality of iterations, further comprising:

decreasing the reconfigurable distance across a third portion of the plurality of iterations after the second portion; and increasing the reconfigurable distance across a fourth portion of the plurality of iterations after the third portion.

4. The method of claim 1, wherein the increasing is at a constant rate across the second portion of the plurality of iterations.

5. The method of claim 1, wherein the neural network based model is a recommender model that is trained to generate a recommended item for an intelligent agent who is conducting a multi-turn conversation with a user.

6. The method of claim 1, wherein the given query and the positive sample belong to a pair of a user utterance and a corresponding agent response in a prior conversation.

7. The method of claim 1, further comprising:

receiving, from a user interface, a user utterance; and encoding, by the trained neural network based model, the user utterance into an utterance representation; and generating, by a decoder head, a recommended response based on the utterance representation.

8. A system for training a neural network based model, the system comprising:

a memory that stores the neural network based model and a plurality of processor executable instructions;

a communication interface that receives a training dataset comprising a plurality of training samples; and one or more hardware processors that read and execute the plurality of processor-executable instructions from the memory to perform operations comprising:

encoding, by the neural network based model, at least a subset of the plurality of training samples into representations in a feature space;

determining, for a given query, a positive sample from the training dataset based on a relationship in the feature space between the given query and the positive sample;

selecting, for the given query, one or more negative samples from the training dataset that are within a reconfigurable distance in the feature space to the positive sample;

computing a loss based on the positive sample and the one or more negative samples;

training the neural network based model based on the loss; and iteratively performing the determining, selecting, computing, and training across a plurality of iterations by:

decreasing the reconfigurable distance across a first portion of the plurality of iterations, wherein a rate of the decreasing is computed based on an estimate of an amount of noise in the training dataset, and increasing the reconfigurable distance across a second portion of the plurality of iterations.

9. The system of claim 8, the operations further comprising:

determining a first subset of samples of the training dataset are of a first category; and determining a second subset of samples of the training dataset are of a second category, wherein the estimate of the amount of noise in the training dataset is proportional to a ratio of a number of samples in the first category to a number of samples in the second category.

10. The system of claim 8, wherein the first portion of the plurality of iterations is before the second portion of the plurality of iterations, the operations further comprising:

decreasing the reconfigurable distance across a third portion of the plurality of iterations after the second portion; and increasing the reconfigurable distance across a fourth portion of the plurality of iterations after the third portion.

11. The system of claim 8, wherein the increasing is at a constant rate across the second portion of the plurality of iterations.

12. The system of claim 8, wherein the neural network based model is a recommender model that is trained to generate a recommended item for an intelligent agent who is conducting a multi-turn conversation with a user.

13. The system of claim 8, the operations further comprising:

receiving, from a user interface, a user utterance; and encoding, by the trained neural network based model, the user utterance into an utterance representation; and generating, by a decoder head, a recommended response based on the utterance representation.

14. A non-transitory machine-readable medium comprising a plurality of machine-executable instructions which, when executed by one or more processors, are adapted to cause the one or more processors to perform operations comprising:

receiving, via a communication interface, a training dataset comprising a plurality of training samples;

encoding, by a neural network based model, at least a subset of the plurality of training samples into representations in a feature space;

determining, for a given query, a positive sample from the training dataset based on a relationship in the feature space between the given query and the positive sample;

selecting, for the given query, one or more negative samples from the training dataset that are within a reconfigurable distance in the feature space to the positive sample;

computing a loss based on the positive sample and the one or more negative samples;

training the neural network based model based on the loss; and iteratively performing the determining, selecting, computing, and training across a plurality of iterations by:

decreasing the reconfigurable distance across a first portion of the plurality of iterations, wherein a rate of the decreasing is computed based on an estimate of an amount of noise in the training dataset, and increasing the reconfigurable distance across a second portion of the plurality of iterations.

15. The non-transitory machine-readable medium of claim 14, the operations further comprising:

determining a first subset of samples of the training dataset are of a first category; and determining a second subset of samples of the training dataset are of a second category, wherein the estimate of the amount of noise in the training dataset is proportional to a ratio of a number of samples in the first category to a number of samples in the second category.

16. The non-transitory machine-readable medium of claim 14, wherein the first portion of the plurality of iterations is before the second portion of the plurality of iterations, the operations further comprising:

decreasing the reconfigurable distance across a third portion of the plurality of iterations after the second portion; and increasing the reconfigurable distance across a fourth portion of the plurality of iterations after the third portion.

17. The non-transitory machine-readable medium of claim 14, wherein the increasing is at a constant rate across the second portion of the plurality of iterations.

18. The non-transitory machine-readable medium of claim 14, wherein the neural network based model is a recommender model that is trained to generate a recommended item for an intelligent agent who is conducting a multi-turn conversation with a user.

19. The non-transitory machine-readable medium of claim 14, wherein the given query and the positive sample belong to a pair of a user utterance and a corresponding agent response in a prior conversation.

20. The non-transitory machine-readable medium of claim 14, the operations further comprising:

receiving, from a user interface, a user utterance; and encoding, by the trained neural network based model, the user utterance into an utterance representation; and generating, by a decoder head, a recommended response based on the utterance representation.

* * * * *